United States Patent
Hillenkamp et al.

(10) Patent No.: US 6,423,966 B2
(45) Date of Patent: *Jul. 23, 2002

(54) METHOD AND APPARATUS FOR MALDI ANALYSIS

(75) Inventors: Franz Hillenkamp, Münster (DE); David M. Lough, Berwickshire; G. Scott Higgins, Glasgow, both of (GB); Dirk Reuter, Norderstedt (DE)

(73) Assignee: Sequenom, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/483,629

(22) Filed: Jan. 14, 2000

Related U.S. Application Data

(63) Continuation of application No. 08/934,455, filed on Sep. 19, 1997, now Pat. No. 6,111,251, which is a continuation-in-part of application No. 08/710,565, filed on Sep. 19, 1996, now Pat. No. 5,777,324.

(51) Int. Cl.[7] .............................................. H01J 49/04
(52) U.S. Cl. ..................................................... 250/288
(58) Field of Search ......................................... 250/288

(56) References Cited

U.S. PATENT DOCUMENTS 3,813,544 A  5/1974  Frazen et al. ............... 250/281

(List continued on next page.)

FOREIGN PATENT DOCUMENTS

DE          3221681          12/1983

(List continued on next page.)

OTHER PUBLICATIONS

Brown, R.S. and J.J. Lennon, Mass Resolution Improvement by Incorporation of Pulsed Ion Extraction in a Matrix-Assisted Laser Desorption/Ionization Linear Time-of-Flight Mass Spectrometer, *Analytical Chemistry* 67: 1998–2003 (1995).

(List continued on next page.)

*Primary Examiner*—Jack Berman
(74) *Attorney, Agent, or Firm*—Stephanie Seidman; Heller Ehrman White & McAuliffe LLP

(57) ABSTRACT

Matrix assisted laser desorption/ionization is performed, in a manner to thermalize large analyte ions in a plume of desorbed material for spectroscopic analysis. The thermalized ions have a low or zero mean velocity and are presented at a well-defined instant in time, reducing artifacts and sharpening the spectral peaks. In one embodiment the light is delivered to a matrix or sample holder having a cover, baffle or compartment. The baffle or compartment impedes or contains a plume of desorbed material and the analyte undergoes collisions to lower its mean velocity and directionality. Thus "thermalized" the analyte ions are passed to a mass analysis instrument. In a preferred embodiment an optical fiber butts up against a thin transparent plate on which the specimen resides, with the matrix side in a vacuum acceleration chamber. A mechanical stage moves the specimen in both the x- and y-directions to select a point on the specimen which is to receive the radiation. The use of a fiber optic illuminator allows the entire stage assembly to be subsumed essentially within the dimensions of a conventional stage. In other embodiments, a thermalizing compartment is provided in a capillary tube about the end of the illumination fiber and the sample matrix is deposited along the inner cylindrical wall of the tube, so the capillary forms a migration path to the outlet for thermalization of the desorbed analyte. In other embodiments microstructures having the shape of a small lean-to, overhang or perforated cover plate, or providing a high aspect surface texture, provide the necessary containment to promote thermalization of the released analyte. A thin layer or cover of fibrous or permeable material may also be used to thermalize the analyte before mass analysis, and in other embodiment thimaterial may also act as the substrate. An automated instrument may include a fixed array of illumination fibers which are illuminated at different times to eject samples from a corresponding array of points on the specimen.

58 Claims, 10 Drawing Sheets s

U.S. PATENT DOCUMENTS

| | | | |
|---|---|---|---|
| 4,204,117 A | 5/1980 | Aberle et al. | 250/287 |
| 4,214,159 A | 7/1980 | Hillenkamp et al. | 250/288 |
| 4,243,887 A | 1/1981 | Hillenkamp et al. | 25/423 P |
| 4,442,354 A | 4/1984 | Hurst et al. | 250/281 |
| 4,725,677 A | 2/1988 | Koster et al. | 536/27 |
| 4,740,692 A * | 4/1988 | Yamamoto et al. | 250/288 |
| 4,778,993 A | 10/1988 | Waugh | 250/257 |
| 4,920,264 A | 4/1990 | Becker | 250/282 |
| 5,045,694 A | 9/1991 | Beavis et al. | 250/257 |
| 5,062,935 A | 11/1991 | Schlag et al. | 204/157.41 |
| 5,118,605 A | 6/1992 | Urdea | 435/6 |
| 5,118,937 A * | 6/1992 | Hillenkamp et al. | 250/288 |
| 5,135,870 A | 8/1992 | Williams et al. | 436/173 |
| 5,202,561 A | 4/1993 | Giessmann et al. | 250/281 |
| 5,210,412 A | 5/1993 | Levis et al. | 250/288 |
| 5,288,644 A * | 2/1994 | Beavis et al. | 436/94 |
| 5,300,774 A | 4/1994 | Buttrill | 250/288 |
| 5,373,156 A | 12/1994 | Franzen | 250/288 |
| 5,376,788 A | 12/1994 | Standing et al. | 250/287 |
| 5,380,833 A | 1/1995 | Urdea et al. | 536/22.1 |
| 5,381,008 A | 1/1995 | Tanner et al. | 250/288 |
| 5,382,793 A | 1/1995 | Weinberger et al. | 250/288 |
| 5,498,545 A | 3/1996 | Vestal | 426/47 |
| 5,503,980 A | 4/1996 | Cantor | 435/6 |
| 5,504,326 A | 4/1996 | Reilly et al. | 250/282 |
| 5,510,613 A | 4/1996 | Reilly et al. | 250/287 |
| 5,547,835 A | 8/1996 | Köster et al. | 435/6 |
| 5,580,733 A | 12/1996 | Lewis et al. | 435/6 |
| 5,591,969 A | 1/1997 | Park et al. | 250/287 |
| 5,605,798 A * | 2/1997 | Koster | 435/6 |
| 5,622,824 A | 4/1997 | Koster et al. | 435/6 |
| 5,625,184 A | 4/1997 | Vestal et al. | 250/287 |
| 5,627,369 A | 5/1997 | Vestal et al. | 250/287 |
| 5,631,134 A | 5/1997 | Cantor | 435/6 |
| 5,641,959 A | 6/1997 | Holle et al. | 250/287 |
| 5,654,545 A | 8/1997 | Holle et al. | 250/287 |
| 5,691,141 A | 11/1997 | Köster | 435/6 |
| 5,700,642 A | 12/1997 | Monforte | 435/6 |
| 5,716,825 A * | 2/1998 | Hancock et al. | 250/288 |
| 5,742,049 A | 4/1998 | Holle et al. | 250/282 |
| 5,760,393 A | 6/1998 | Vestal et al. | 250/282 |
| 5,770,860 A * | 6/1998 | Franzen | 250/288 |
| 5,777,324 A * | 7/1998 | Hillenkamp | 250/288 |
| 5,777,325 A | 7/1998 | Weinberger et al. | 250/287 |
| 5,795,714 A | 8/1998 | Cantor et al. | 435/6 |
| 5,830,655 A | 11/1998 | Monforte et al. | 435/6 |
| 5,864,137 A | 1/1999 | Becker et al. | 250/287 |
| 5,869,242 A | 2/1999 | Kamb | 435/6 |
| 5,885,775 A | 3/1999 | Haff et al. | 435/6 |
| 5,900,481 A | 5/1999 | Lough et al. | 536/55.3 |
| 6,111,251 A * | 8/2000 | Hillenkamp | 250/288 |

FOREIGN PATENT DOCUMENTS

| | | |
|---|---|---|
| FR | 2597260 | 10/1987 |
| WO | 9014148 | 11/1990 |
| WO | 9213629 | 8/1992 |
| WO | 9411530 | 5/1994 |
| WO | 9416101 | 7/1994 |
| WO | 9421822 | 9/1994 |
| WO | 9507361 | 3/1995 |
| WO | 9629431 | 9/1996 |
| WO | 9632504 | 10/1996 |
| WO | 9636731 | 11/1996 |
| WO | 9636986 | 11/1996 |
| WO | 9636987 | 11/1996 |
| WO | 9708306 | 3/1997 |
| WO | 9716699 | 5/1997 |
| WO | 9737041 | 10/1997 |
| WO | 9742348 | 11/1997 |
| WO | 9743617 | 11/1997 |
| WO | 9812734 | 3/1998 |
| WO | 9820019 | 5/1998 |
| WO | 9820020 | 5/1998 |
| WO | 9820166 | 5/1998 |
| WO | 9912040 | 3/1999 |
| WO | 9831273 | 6/1999 |
| WO | 9957318 | 11/1999 |

OTHER PUBLICATIONS

Andersen, et al., Electrospray ionization and matrix assisted laser desorption/ionization mass spectrometry: Powerful analytical tools in recombinant protein chemistry, *Nature Biotech.* 14:449–457 (1996).

Ardrey, "Elctrospray mass spectrometry", *Spectroscopy Europe* 4(4):10–18 (1992).

Arlinghaus et al., "Applications of resonance ionization spectroscopy for semiconductor, environmental and biomedical analysis, and for DNA sequencing", *SPIE*, vol. 1435, *Opt. Methods Ultrasensitive Detect. Anal. Tech. Appl.* pp. 26–35 (1991).

Beck et al., Chemiluminescent detection of DNA: application for DNA sequencing and hybridization, *Nucl Acids Res* 17:5115–5123 (1989).

Beck et al., Applications of dioxetane chemiluminescent probes to molecular biology, *Anal. Chem.* 62:2258–2270 (1990).

Berenkamp et al., "Infrared MALDI Mass Spectrometry of large Nucleic Acids" *Science* 281:260–262 (1998).

Braun et al., Detecting CFTR gene mutations by using primer oligo base extension and mass spectrometry, *Clinical Chemistry* 43:1151–1158 (1997).

Braun et al., Improved Analysis of Microsatellites Using Mass Spectrometry, *Genomics* 46:18–23(1997).

Broude et al., Enhanced DNA sequencing by hybridization, *Proc. Natl. Acad. Sci. USA* 91:3072–3076 (1994).

Brown et al., "A single–bead decode strategy using electrospray ionization mass spectrometry and a new photolabile linker: 3–amino–3–(2–nitrophenyl) propionic acid", *Mol. Diversity* 1:4–12 (1995).

Caldwell et al., Mid–infrared matrix assisted laser desorption ionization with a water/glycerol matrix, *Applied Surface Science* 127–129:242–247 (1998).

Covey, et al., The determination of protein, oligonucleotide and peptide molecular weights by ion–spray mass spectrometry, *Rapid Comm. Mass Spectrom.* 2:249–256 (1988).

Crain, Mass spectrometric techniques in nucleic acid research, *Mass Spectrom. Rev.* 9:505–554 (1990).

Database Derwent WPI 003843590, citing German Patent No. 3221681, Mass spectrometer with external specimen holder—is esp. for vaporising and ionising sample and has thin polymer foil providing vacuum at entry window.

Database Derwent WPI 007346844, citing French Patent No. 2597260, Sample introduction system for mass spectrometry—has table carrying sample series inserted in spectrometer chamber and rotated to present each to source in turn.

Eckstein (ed.), *Oligonucleotides and Analogues*, IRL Press, Oxford (1991).

Edmonds et al., Thermospray liquid chromatography–mass spectrometry of nucleosides and of enzymatic hydrolysates of nucleic acids, *Nucleic Acids Research* 13:8197–8206 (1985).

Ehring, H. et al., "Photochemical versus thermal mechanisms in matrix–assisted laser desorption/ionization probed by back side desorption", *Rapid Comm. in Mass Spect.* 10:821–824 (1996).

Frank and Köster, DNA chain length and the influence of base composition on electrophoretic mobility of oligodeoxyribonucleotides in polyacrylamide–gels, *Nucl. Acids Res.* 6:2069–2087 (1979).

Fu et al., Sequencing exons 5 to 8 of the p53 gene by MALDI–TOF mass spectrometry, *Nat Biotechnol* 16:381–4 (1998).

Fu et al., Sequencing double–stranded DNA by strand displacement, *Nucl Acids Res* 25:677–679 (1997).

Fu et al., A DNA sequencing strategy that requires only five bases of known terminal sequence for priming, *Proc. Natl. Acad. Sci. USA* 92:10162–10166 (1995).

Fu et al., Efficient preparation of short DNA sequence ladders potentially suitable for MALDI–TOF DNA sequencing, *Genetic Analysis* 12:137–142 (1996).

Ganem et al., Detection of oligonucleotide duplex forms by ion–spray mass spectrometry, *Tetrahedron Letters* 34:1445–1448, (1993).

Gildea et al., A versatile acid–labile linker for modification of synthetic biomolecules, *Tetrahedron Letters* 31:7095–7398 (1990).

Gross et al., Investigations of the metastable decay of DNA under ultraviolet matrix–assisted laser desorption/ionization conditions with post–source–decay analysis and hydrogen/deuterium exchange, *J Amer Soc for Mass Spect* 9:866–878 (1998).

Gruić–Sovulj I. et al., Matrix–assisted laser desorption/ionisation mass specrometry of transfer ribonucleic acids isolated from yeast, *Nucleic Acids Res.* 25(9):1859–61 (1997).

Haglund et al., Marix–assisted laser–desorption mass spectrometry of DNA using an infrared free–electron laser, *Proc. SPIE* 1854:117–128 (1993).

Hillenkamp and Ehring, "Laser desorption mass spectrometry Part 1: Basic mechanisms and techniques", *Mass Spectrometry in the Biological Sciences: A tutorial*, pp. 165–179 (1992).

Hillenkamp et al., "Matrix Assisted UV_Laser Desorption/ionization: A New Approach to Mass Spectrometry of Large Biomolecules", *Bio Mass Spectr.*, Burlingame and McCloskey (eds.), pp. 49–61, Elsevier Science Publishers B.V., Amsterdam (1989).

Hsiung et al., A new simpler photoaffinity analogue of peptidyl rRNA, *Nucl Acids Res* 1:1753–1762 (1974).

Huth–Fehre et al., Matrix–assisted laser desorption mass spectrometry of oligodeoxythymidylic acids, *Rapid Comm in Mass Spect* 6:209–213 (1992).

Jacobson, et al. Applications of mass spectrometry to DNA sequencing, *GATA* 8:223–229 (1991).

Ji et al., Two–dimensional electrophoretic analysis of proteins expressed by normal and cancerous human crypts: Application of mass spectrometry to peptide–mass fingerprinting, *Electrophoresis* 15:391–405 (1994).

Juhasz et al., Applications of delayed extraction matrix–assisted laser desorption ionization time–of–flight mass spectrometry to oligonucleotide analysis, *Analy Chem* 68:941–946 (1996).

Jurinke et al., Application of nested PCR and mass spectrometry for DNA–based virus detection: HBV–DNA detected in the majority of isolated anti–HBc positive sera, *Genetic Analysis* 14:97–102 (1998).

Jurinke et al., Recovery of nucleic acids from immobilized biotin–streptavidin complexes using ammonium hydroxide and applications in MALDI–TOF mass spectrometry, *Anal. Chem.* 69:904–910 (1997).

Jurinke et al., Analysis of ligase chain reaction products via matrix–assisted laser desorption/ionization time–of–flight-mass spectrometry, *Analy Biochem* 237:174–181 (1996).

Jurinke et al., Detection of hepatitis B virus DNA in serum samples via nested PCR and MALDI–TOF mass spectrometry, *Genetic Analysis* 13:67–71 (1996).

Kirpekar et al., DNA sequence analysis by MALDI mass spectrometry, *Nucleic Acids Res.* 26:2554–9 (1998).

Köster et al., A strategy for rapid and efficient DNA sequencing by mass spectrometry, *Nature Biotech* 14:1123–1128 (1996).

Köster et al., Oligonucleotide synthesis and multiplex DNA sequencing using chemiluminescent detection, *Nucl Acids Res* 24:318–321 (1991).

Köster et al., N–ACYL proecting groups for deoxynucleosides, A quantitative and comparative study, *Tetrahedron* 37:363–369 (1981).

Köster et al., Polymer support oligonucleotide synthesis—XV$^{1,2}$, *Tetrahedron* 40:102–112 (1984).

Köster et al., Some improvements in the synthesis of DNA of biological interest, *Nucl Acids Res* 7:39–59 (1980).

Köster et al., Well–defined insoluble primers for the enzymatic synthesis of oligo– and polynucleotides, *Hoppe–Seyler's Z. Physiol. Chem.* 359:11579–1589 (1978).

Lawrance et al., Megabase–scale mapping of the HLA gene complex by pulsed field gel electrophoresis, *Science* 235:1387–1389 (1987).

Lennon, J. and Glish, G., "A transmission geometry probe for MALDI", Poster Abstract.

Li et al., High–Resolution MALDI Fourier Transform Mass Spectrometry of Oligonucleotides, *Anal Chem* 68:2090–2096 (1996).

Little et al., Verification of 50– to 100–mer DNA and RNA sequences with high–resolution mass spectrometry, *Proc. Natl. Acad. Sci. USA* 92:2318–2322 (1995).

Little et al., Mass spectrometry from miniaturized arrays for full comparative DNA analysis, *Nature Med* 3:1413–1416 (1997).

Little et al., MALDI on a chip: analysis of arrays of low–femtomole to subfemtomole quantities of synthetic oligonucleotides and DNA diagnostic products dispensed by a piezoelectric pipet, *Anal Chem* 69:4540–4546 (1997).

Little et al., Direct detection of synthetic and biologically generated double–stranded DNA by MALDI–TOF MS, *Int'l J. Mass Spectrom. Ion Processes* 169/170:323–330 (1997).

Little et al., Identification of apolipoprotein E polymorphisms using temperature cycled primer oligo base extension and mass spectrometry, *Eur. J. Clin. Chem. Clin. Biochem.* 35:545–548 (1997).

Little et al., Detection of RET proto–oncogene codon 634 mutations using mass spectrometry, *J. Mol Med.* 75:745–750 (1997).

Monforte and Becker, High–throughput DNA analysis by time–of–flight mass spectrometry, *Nature Medicine* 3:360–362 (1997).

Mosca et al., Mass spectrometry and DNA analysis, *Hemoglobin* 17(3):261–268 (1993).

Nordhoff, E., "Matrix–assisted laser desorption/ionization mass spectrometry of nucleic acids with wavelengths in the ultraviolet and infrared", *Rapid Comm. in Mass. Spec.* 6:771–776 (1992).

Nordhoff et al., Ion stability of nucleic acids in infrared matrix–assisted laser desorption/ionization mass spectrometry, *Nuc Acids Res.* 21:3347–3357 (1993).

O'Donnell et al., MassArray as an enabling technology for the industrial–scale analysis of DNA, *Genetic Engineering News* 17 (1997).

O'Donnell et al., High–density, covalent attachment of DNA to siliocn wafers for analysis by MALDI–TOF mass spectrometry, *Analytical Chemistry* 69:2438–2443 (1997).

O'Donnell–Maloney et al., Microfabrication and array technologies for DNA sequencing and diagnostics, *Genetic Analysis: Biomolecular Engineering* 13:151–157 (1996).

Overberg et al., "Laser Desorption Mass Spectrometry. Part II Performance and Applications of Matrix–Assisted Laser Desorption/Ionization of Large Biomolecules", *Mass Spect in the Biolog Science: A Tutorial 181–197* (1992).

Pieles et al., Matrix–assisted laser desorption ionization time–of–flight mass spectrometry: a powerful tool for the mass and sequence analysis of natural and modified oligonucleotides, *Nucleic Acid Res.* 21:3191–3196 (1993).

Pomerantz et al., Determination of oligonucleotide composition from mass spectrometrically measured molecular weight, *Am. Soc. Mass Spectrom.* 4:204–09 (1993).

Product brochure for LAMMA 500 Laser Microprobe Mass Analyzer, (Leybold–Heraeus GMBH), 3–15 (1983).

Prome et al., Use of combined mass spectrometry methods for the characterization of a new variant of human hemoglobin: The double mutant hemoglobin villeparisis beta 77(EF1), *J. American Society for Mass Spect* 7(2):163–167 (1996).

Ruppert et al., A rapid and high throughput method for plasmid isolations, Presented: Automation in Mapping and DNA Sequencing Conference, Aug. 31—Sep. 2, 1994.

Ruppert et al., A filtration method for plasmid isolation using microtiter filter plates, *Anal. Biochem.* 230:130–134 (1995).

Ruppert et al., Preparation of plasmid DNA as sequencing templates in a microtiter plate format, Paper presented, Cold Spring Harbor Laboratory.

Schram, Mass spectrometry of nucleic acid componenents, *Biomed. App. Mass Spectrom.* 34:203–287 (1990).

Sequenom Signs Agreement With Bruker–Franzen Analytik to Develop Mass Spectrometer for DNA Massarray Analysis, Press Release: Jan. 12, 1998, http://www.sequenom.com/pressrelease.htm.

Sequenom Reports DNA MassArray™ Technology More Sensitive Than Electrophoretic Methods in Detecting Gene Mutations: Automated DNA Analysis System Can Speed Up Microsatellite Analyses, Press Release: Dec. 15, 1997, http://www.sequenom.com/pressrelease.htm.

Sequenom Advances the Industrial Genomics Revolution with the Launch of Its DNA MassArray™ Automated Process Line, Press Release: Sep. 28, 1998, http://www.sequenom.com/pressrelease.htm.

Sequenom Reports On Use of Its DNA MassArray™ Technology to Analyze Genes Associated with Alzheimer's Disease adn Arteriosclerosis: Technology Has Applications in Drug Development, Press Release: Sep. 22, 1997, http://www.sequenom.com/pressrelease.htm.

Sequenom Uses DNA MassArray™ to Sequence Section of Human Cancer–Related p53 Gene, Press Release: Mar. 27, 1998, http://www.sequenom.com/pressrelease.htm.

Shaler et al., Effect of Impurities on the matrix–assisted laser desorption mass spectra of single–stranded oligodeoxynucleotides, *Anal. Chem.* 68:576–579 (1996).

Siegert et al., Matrix–assisted laser desorption/ionization time–of–flight mass spectrometry for the detection of polymerase hain reaction products containing 7–deasapurine moieties, *Anal. Biochem.* 243:55–65 (1996).

Sinha et al., β–cyanoethyl N, N–dialkylamino/N–morpholinomonochloro phosphoamidites, new phosphitylating agents facilitating ease of deprotection and work–up of synthesized oligonucleotides, *Tetrahedron Lett.* 24:5843–5846 (1983).

Sinha et al., Polymer support oligonucleotide synthesis XVII: Use of B–cyanoethyl–N, N–dialkylamino–/N–morpholino phosphoramidite of deoxynucleosides for the synthesis of DNA fragments simplifying deprotection and isolation of final product, *Nucleic Acids Res.* 12:4539 (1984).

Siuzdak, Gary, "The emergence of mass spectrometry in biochemical research", *Proc. natl. Acad. Sci. USA* 91:11290–11297 (1994).

Smith et al., Capillary zone electrophoresis–mass spectrometry using an electrospray ionization interface, *Anal. Chem.* 60:436–441 (1988).

Smith R. D., "New Developments in Biochemical Mass Spectrometry: Electrospray Ionization", *Anal. Chem.* 62:882–899 (1990).

Sproat et al., The synthesis of protected 5'–amino–2', 5'–dideoxyribonucleoside–3'–O–phosphoramidites; applications of 5'–amino–oligodeoxyribonucleotides, *Nucleic Acids Res.* 15:6181–6196 (1987).

Stults and Marsters, "Improved electrospray ionization of synthetic oligodeoxynucleotides", *Rapid Comm. Mass Spectrom.* 5:359–363 (1991).

Tang, et al., Improving mass resolution in MALDI/TOF analysis of DNA.

Tang et al., Matrix–assisted laser desorption/ionization mass spectrometry of immobilized duplex DNA probes, *Nucleic Acids Research* 23:3126–3131 (1995).

Valaskovic, et al., Attomole–sensitivity electrospray source for large–molecule mass spectrometry, *Anal. Chem.* 67:3802–3805 (1995).

Vertes A. et al., "Matrix–assisted laser desorption of peptides in transmission geometry", *Rapid Comm. in Mass Spect.* 4(7):263–266 (1990).

Vorm et al., Improved resolution and very high sensitivity in MALDI TOF of matrix surfaces made by fast evaportion, *Anal. Chem.* 66:3281–3287 (1994).

Wu et al., Time–of–Flight Mass Spectrometry of Underivatized Single–Stranded DNA Oligomers by Matrix–Assisted Laser Desorption, *Anal. Chem.* 66:1637–1645 (1994).

Wu et al., Matrix–assisted Laser Desorption Time–of–flight Mass Spectrometry of Oligonucleotides Using 3–Hydroxypicolinic Acid as an Ultraviolet–sensitive Matrix, *Rapid Comm Mass Spec* 7:142–146 (1993).

Yamashita et al., Electrospray ion source. Another variation on the free–jet theme, *J. Phys. Chem.* 88:4451–4459, (1984).

* cited by examiner

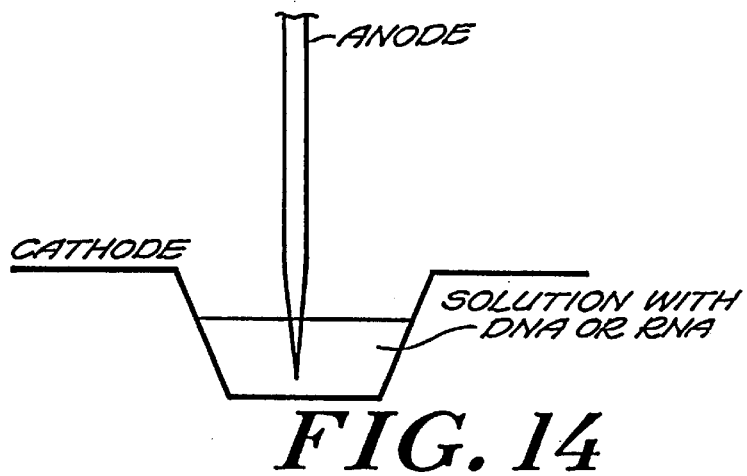

FIG. 14

Experimental flow diagram:

PCR: 50μl volume (3' modified primers)
⇩
Addition of functionalised beads, incubation, capture of unused primers
⇩
Aliquot PCR reaction to sequencing mixes (A,C,G,T)
⇩
Aliquot sequencing mix into sequencing plate (192/384-well, 48/96 seq. $R_x$n's)
⇩
Addition of sequencing primer(s), 5' modified to allow capture
⇩
Cycle sequencing reaction: 10μl volume
⇩
Application of pin tool, capture of sequencing products
⇩
Wash steps (3 x $NH_4Cit$)
⇩                    ⇩
Addition of matrix    Removal to chips
                      ⇩
                      Addition of matrix
⇩
Mass spectrometry

FIG. 15

METHOD AND APPARATUS FOR MALDI ANALYSIS

RELATED APPLICATIONS

This application is a continuation of U.S. application Ser. No. 08/934,455, filed Sep. 19, 1997 which is a continuation-in-part of U.S. application Ser. No. 08/710,565, filed Sep. 19, 1996, now U.S. Pat. No. 5,777,324, each of which is incorporated herein by reference in its entirety.

BACKGROUND

The present invention relates to Matrix Assisted Laser Desorption/Ionization Mass Spectrometry (MALDI-MS). This method introduced by Karas and Hillenkamp in 1988 has become established as a method for mass determination of biopolymers and substances such as peptides, proteins and DNA fragments. In this method, the substance to be analyzed is typically placed in a solution of matrix material and coated onto a support. The solute evaporates, leaving the analyte in a solid matrix which is then illuminated to cause the analyte molecules or synthetic polymers to be desorbed. This desorption process is especially useful for releasing large biological molecules without charring, fragmentation or chemical degradation to a mass spectrometer or similar instrument for separation and detection.

In common MALDI mass spectrometry setups, the sample is placed on a metal substrate and is irradiated from the side facing the ion analyzer ("top illumination"). In contrast to this arrangement, transmission illumination is also possible wherein the rear side of the sample is illuminated through a transparent substrate, for example by a focused laser beam. In either event, the matrix consisting of a relatively low molecular weight aromatic organic substance such as nicotinic acid, benzoic or cinnamic acid, holds a quantity of the peptide, protein or other substance to be analyzed and is irradiated with a high intensity laser beam to cause desorption of the analyte from a surface of the sample. In a representative mass spectrometry arrangement, ions of the analyte are subjected to electric field acceleration for mass separation in the instrument, such as a time-of-flight (TOF) mass spectrometer. The laser radiation is selected such that matrix strongly absorbs at the laser wavelength and desorbs material sufficiently quickly to form an ejecting plume at its outer surface. The laser wavelength, however, is sufficiently long to not break bonds of the analyte, and the desorption process is non-thermal so that large molecules are provided to the spectrometer instrument substantially intact. The mechanism of desorbing or ejecting large molecules from a relatively light matrix material is quite general, and allows one to detect analytes having a mass of tens or hundreds of kiloDaltons. Various techniques for preparing certain classes of substances for desorption from a variety of matrix materials have extended the usefulness of the technique.

In conventional instruments, the standard configuration involves performing both illumination and mass analysis from the same side of the sample. This produces a relatively high yield of large molecule ions and good mass resolution. Illumination spot sizes of between 50 and 1000 a micrometers in diameter have been used with illumination levels in the range of $10^6$–$10^7$ watts/square centimeter to essentially eject small volumes of the sample and provide a short, high velocity plume of material for analysis. An extensive library of organic large molecule spectra has been built up using such instruments. Nonetheless, the geometrical requirements of providing an ion extraction and acceleration optics in a vacuum flight chamber with a number of high voltage electrodes to accelerate the material to an analysis detector impose constraints on the optical path of the laser illumination beam, resulting in a relatively costly and inflexible instrument. Furthermore, the provision of a relatively high energy plume as the initial ion source results in a spread of velocities and spatial position of the initial burst of ions, which in addition are subject to differing electric fields because of the spatial spread of the plume, so that, while the instrument provides a good yield of analyte, the mass resolution is compromised. In general, the matrix molecules provide an internal reference peak. However, since the analyte is often many times greater in mass, and the mechanism of desorption is also not fully understood, it is also possible that the acquired spectra include unrecognized shifts and other artifacts resulting from initial plume geometry or release dynamics that will complicate the accuracy of mass determination and a comparison with independently produced spectra in the future.

Various researchers have explored transmission MALDI for different materials and one or more matrix compositions, and have been able under some conditions to obtain results analogous to those accumulated using the more prevalent top side illumination. In general, by separating illumination and the mass analysis instrumentation on opposite sides of a matrix one might expect to implement different instrument designs with greater freedom. In particular, scanning arrangements might be implemented to allow the selective analysis of particular spots or sample locations. Furthermore, the ability to provide ion desorption from a defined surface may be expected to yield sharper spectra. However in switching from a top illumination configuration to a transmission illumination configuration, one of necessity changes the nature of a number of essential processes underlying the desorption technique. Thus for example the shape of the plume, the velocities or directions of molecules or ions upon release, and the underlying mechanism or yield of the release may all be affected by a change in the illumination/desorption geometry. Relatively few experiments have utilized transmission illumination, and these have in general yielded lower quality spectra than top illumination, and have been tried only with a limited range of relatively light analyte molecules.

The essential mechanisms by which material is desorbed are not fully understood, and effects may vary with different materials. In general, to make a measurement one tunes the analyzer by setting appropriate electric and/or magnetic fields, or otherwise defining a sample window, then illuminates the matrix, progressively increasing the fluence until the spectrometer starts to detect desorbed ions. The fluence may generally then be increased somewhat to increase the amount of the heavy analyte present in the desorbed material, but should not be increased so much as to introduce charring or fragmentation of the material. In general, increase in illumination fluence increases the amount of material released. However, as described above, the mass resolution, which is initially limited, may suffer due to an increased spread of initial velocities, the irregular geometry of the emission plume or other factors.

It is therefore desirable to provide a transmission MALDI method or apparatus in which resulting spectra are identical to or well correlated with MALDI spectra obtained in top illumination of similar compounds.

It is also desirable to provide new transmission MALDI stages or mechanisms for desorption of an analysis sample.

It is also desirable to provide a MALDI spectrometry process wherein the peaks are improved, and mass resolution refined.

SUMMARY

One or more of the above desirable ends are achieved in accordance with the present invention by carrying out matrix assisted laser desorption analysis in a manner to inject analyte ions into a spectrometric analysis system with a low or zero mean velocity at a defined instant in time. In one embodiment the laser light is delivered to a matrix or sample holder having a cover, baffle or compartment. The laser illuminates the matrix, preferably over a relatively large spot at a fluence in the range of $10^6$ watts/square centimeter, causing the desorption of analyte and matrix material which is released in a plume. The baffle or compartment impedes or contains the plume to instantaneously define a region with a relatively high density of analyte and matrix. The analyte, which may have a molecular weight tens to thousands of times greater than the matrix, undergoes collisions to achieve a mean velocity which is low or zero. Thus "thermalized" the analyte ions are passed from the baffle region to undergo a conventional mass analysis.

In a preferred embodiment of a stage useful for the practice of the invention, the laser illumination is provided by the output end of an optical fiber which may for example receive illumination at its input end from a gas laser, a hybrid frequency-multiplying laser arrangement, a high powered laser diode array, or a diode-pumped source. The end of the optical fiber butts up against a thin transparent plate on which the sample reside, the sample being on the side of the plate opposite the fiber facing in a vacuum acceleration chamber. Preferably, a mechanical stage moves the plate in both the x- and y- in-plane directions to select a sample or a point on a given sample which is to receive the radiation. The use of a fiber optic illuminator allows the entire stage assembly to be subsumed essentially within the dimensions of a conventional instrument stage yet provide a robust and accurate illumination source of well defined intensity and high uniformity. Emission from the source then illuminates the sample, causing the analyte to be desorbed at a surface of the plate facing the mass analyzer assembly. In accordance with one aspect of the invention the plume is partially confined so that its highly directional momentum is randomized, or "thermalized". After thermalizing, the plume environment contains slow ions which are accelerated in the analyzer, separating each characteristic charge/mass component into a sharply defined interval for spectrometric detection.

In other embodiments, a thermalizing region is defined by a small ferrule or capillary-like tube enclosure which surrounds a region at the end of The illumination fiber. The matrix is deposited along the inner cylindrical wall of the tube, where the divergent fiber output illuminates the matrix. The tube provides a short tunnel as a migration path to the outlet in which the desorbed material is initially ejected with oblique paths for thermalization of the desorbed analyte. In other embodiments microstructures having the shape of a small lean-to, overhang or perforated cover plate provide containment to increase residence time or provide collisional interaction for thermalization of the released analyte. Such a confining microstructure can also be formed by the sample crystals and the surface of the substrate if the crystallization process is specifically controlled to achieve such structures.

The latter constructions may include a two stage release configuration wherein the laser illumination forms a plume which then fills a compartment. The compartment has an opening in one wall through which the thermalized ions which have migrated from the illumination plume are emitted. In this two-stage construction, the distance between illumination and outlet is made large enough to thermalize the large molecules, but small enough to assure that emission of analyte ions occurs in a short time interval that does not broaden the TOF peak width.

BRIEF DESCRIPTION OF THE DRAWINGS

These and other features of the invention will be understood from the description of representative embodiments of the method herein and the disclosure of illustrative apparatus for carrying out the method, taken together with the Figures, wherein

FIG. 11A shows a solid pin with a straight head. FIG. 11B shows a solid pin with a concave head. FIG. 11C shows a solid pin with a truncated pyramidal head. FIG. 11D shows a pin with a concave head and a hollowed center (through which can be inserted an optical fibre). FIG. 11E shows a pin with a truncated pyramidal head and hollowed center.

FIG. 14 schematically depicts a pintool onto which a voltage is applied. When an electrical field is applied, nucleic acids are attracted to the anode. This system would also purify nucleic acids, since uncharged molecules would remain in solution, while positively charged molecules would be attracted towards the cathode.

FIG. 15 shows a flow chart of the steps involved in sequencing by mass spectrometry using post-biology capture.

DETAILED DESCRIPTION OF THE PREFERRED EMBODIMENTS

Figure 1:
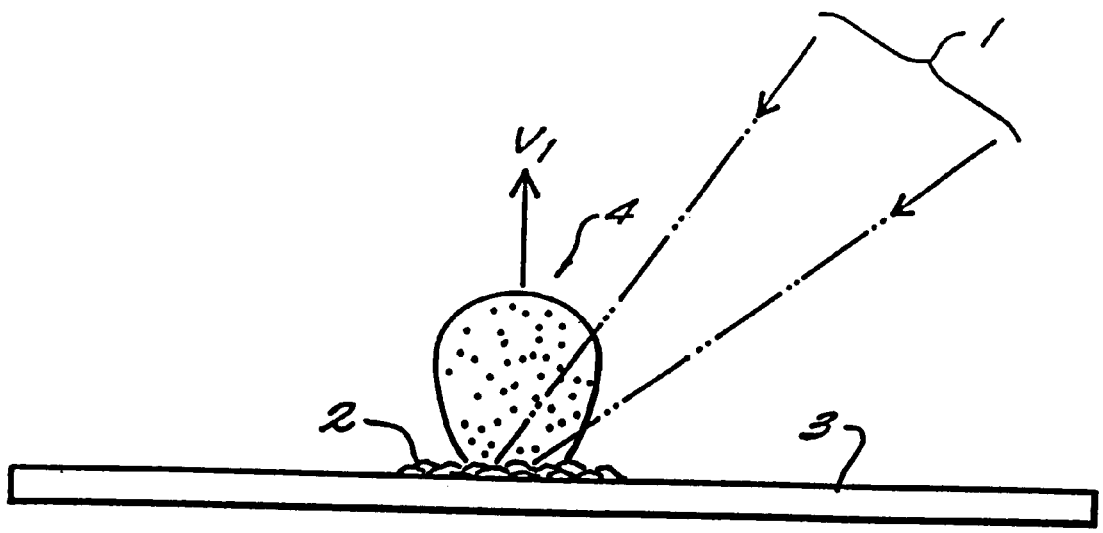
FIG. 1 illustrates a prior art MALDI analysis technique.

FIG. 1 shows a representative prior art set up for the matrix assisted laser desorption and ionization of a specimen such as a large molecule compound having a molecular weight, for example, in the range of 500 to 100,000 daltons or more. As shown, a substrate 3 such as a sheet of metal foil or a glass slide, bears a sample 2 in a region on its surface. As discussed above, sample 2 is generally deposited as a solution of a relatively low molecular weight laser-absorbent material with a minor amount of the large molecule analyte contained therein, and it is allowed to dry in place to form a thin layer of solid material which may for example consist of a granular or continuous bed of crystals. In special cases a solvent, stable in vaccuo is used such as glycerol. The sample 2 then forms a thin liquid layer or droplet on substrate 3. A laser beam 1 is directed at the sample 2 causing a plume 4 of material to be desorbed therefrom. In general, the matrix material is taken to be a low molecular weight compound, e.g. an aromatic compound for desorption with wavelengths in the ultraviolet (UV), and the laser has a wavelength selected to excite and be strongly absorbed by the matrix material. Illumination of the sample then results in desorption of material therefrom and formation of a plume 4 which expands away from the illuminated site as shown in this figure. While the mechanism of large molecule desorption is not fully understood, it is clearly different from a "thermal" evaporation and it is a very fast event; the analyte therefore enters the surrounding vacuum chamber without extensive chemical degradation. However, as further illustrated in FIG. 1 the desorbed material is highly directional, having a large component of velocity in the direction normal to the surface indicated by vector $V_1$ in the figure. The plume expansion velocity is typically on the order of 500 to 1,000 meters per second.

In a typical analysis process, the desorbed material in plume 4 is provided to a mass spectrometer such as a sector or quadrupole scanning spectrometer which provides both acceleration and a mass-dependent transmission from, or to a time of flight (TOF) mass analyzer. Generally a time of flight instrument is preferred since the relatively small amount of sample in the plume results in a very low collection efficiency, poor sensitivity and difficulty in setting up for a sector scanning instrument.

For a time of flight instrument, the kinetics of molecular transport may be roughly modeled based on certain assumptions about the nature of the plume, the geometry of the plume generation stage, and surrounding electrodes and field strengths. When setting up such a model, the mass resolution, $m/\Delta m$, may, with the initial velocity and certain simplifying assumptions, be approximated as the magnitude of a sum of terms, including a term varying with the initial velocity spread and plume extent in relation to electrode spacing. Basically, initial velocity (energy) spread, the extent to which the plume subjects molecules to different field conditions, and the extent to which the ions undergo collisions or experience a turnaround time in the desorption and acceleration geometry, all introduce a spreading in the time of arrival peaks at the detector.

Figure 2:
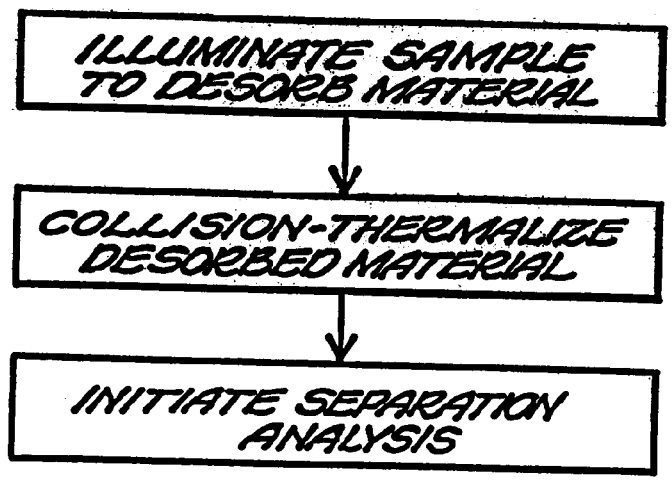
FIG. 2 illustrates steps of MALDI analysis in accordance with the present invention.

These problems are addressed in accordance with a principal aspect of the present invention by a method for the laser desorption and ionization of a sample as set forth in FIG. 2. In general, the sample consists of a solid matrix including the analyte material to be measured, and is deposited on a support for illumination by a laser, substantially as in the prior art. As set forth in FIG. 2 as a first step the sample is illuminated causing material to be desorbed therefrom. In general the illumination step is effected by a short pulse of laser radiation having a duration of 0.5–200 nanoseconds and directed at an illumination spot with a diameter between approximately ten micrometers and several hundred micrometers, and an irradiance in the range of $10^6$ watts/square centimeter or more to form a plume of desorbed and ionized material. As noted above, this desorbed material initially has a directional momentum imparted to it by the physical processes of laser-induced desorption. In accordance with the present invention a second step confines this desorbed material for a period such that the directional momentum is at least partially thermalized, i.e., randomized in direction and reduced in overall magnitude, by undergoing internal collisions and collisions with the surroundings before being subjected to spectrometric separation. It is understood that the plume itself is of small dimension, and the confinement is of corresponding dimension, for example, with a wall spacing such that analyte molecules in the plume undergo at least one collision with a surrounding wall or obstruction. The invention also contemplates that the thermalization may be accomplished using a two stage ion extraction in which low field strength is provided in an initial region to result in an extended residence time near the initial site of the plume before acceleration.

In general the invention may be practiced with either transmission or top illumination geometries, although different factors enter into consideration for positioning the actual containment and acceleration structures in relation to the substrate. Representative physical embodiments of the invention will be described below, with particular reference to a time of flight mass analysis instrument. However as will be apparent from the general description, the invention serves equally well and provides significant improvements when operated as the sample input for various other analysis instruments such as an ion trap, and ion cyclotron resonance Fourier transform mass spectrometer, and other instruments used to detect or characterize ions at low pressure.

Figure 3A:
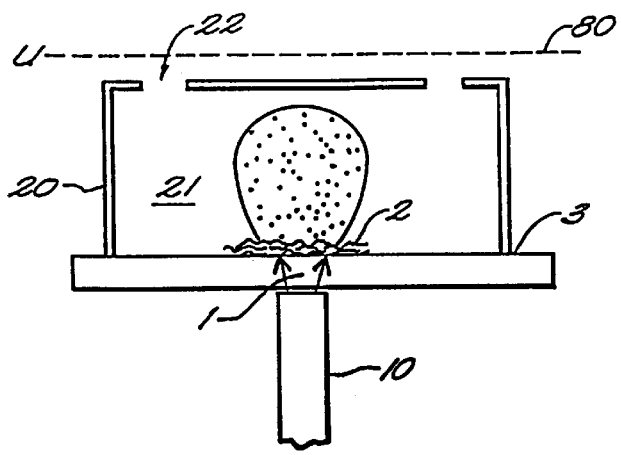
FIGS. 3A and 3B illustrate a basic embodiment of an apparatus in accordance with the present invention for two different sample mounts for a transmission MALDI analysis, respectively.
Figure 3B:
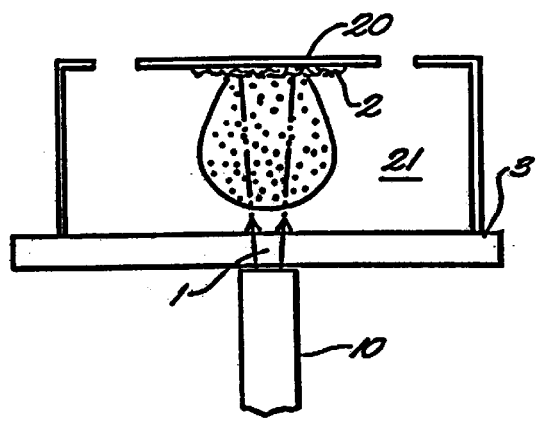

FIGS. 3A and 3B illustrate a basic embodiment of the present invention, with the elements corresponding to those of FIG. 1 numbered correspondingly. As shown in FIG. 3A, an optical fiber 10 which may, for example, have a core of 140 or 200 micrometers in diameter, is butted up against one face of a transparent substrate 3 upon which a sample 2 comprised of a matrix with the analyte therein is deposited. Here a dried matrix is illustrated. The fiber 10 illuminates the sample 2 with its divergent output beam 1 causing a plume of desorbed material to emanate therefrom. As further shown in FIG. 3A, a containment structure 20 forms a compartment 21 about the plume having one or more exit apertures 22 in a wall thereof. The dimensions of the compartment 21 are comparable to that of the illumination spot e.g. 10 to 500 micrometers, and may be of the same order of magnitude of the extent of plume, such that the plume expands to fill the compartment within a few hundred nanoseconds.

The configuration shown in FIGS. 3A and 3B are both transmission illumination configurations in that the laser light illuminates the sample from a direction opposite to the ion extraction direction. In the configuration of FIG. 3A the sample is placed directly on the transparent substrate such that the fiber illuminates the sample from the bottom side, i.e. the side facing the substrate. As a result the material is desorbed from the bottom side of the sample; the sample 2 may for example consist of microcrystals in a layer several micrometers thick on a substrate and the plume may consist largely of material which has been desorbed from the bottom (substrate-facing) side of the crystals and which has turned around before forming the main body of the projecting plume.

FIG. 3B shows a corresponding configuration of this embodiment for reflection MALDI. In this embodiment, the sample 2 is deposited not on the substrate 3 separating the fiber and analysis chamber, but on a wall 20 of the enclosure. The fiber 10 then shines its beam through the substrate and across a small gap constituting the compartment to the sample on the far side. In either case, the plume expands into the compartmentalized space 21.

Figure 4A:
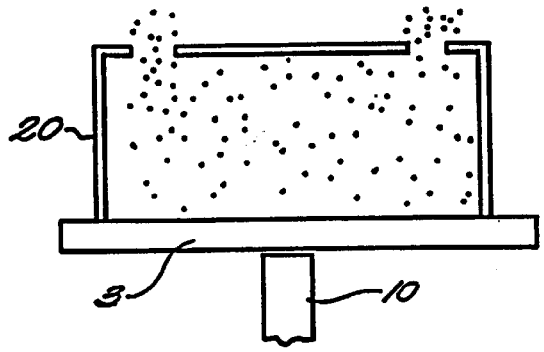
FIGS. 4A and 4B illustrate stages of operation of the embodiment of FIGS. 3A or 3B.
Figure 4B:
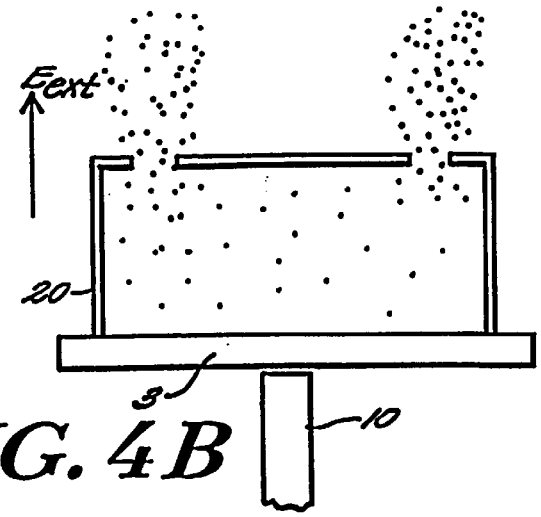

FIGS. 4A and 4B illustrate the subsequent evolution of the plume over time. As discussed above, the velocity of molecules in the plume may initially be on the order of several hundred meters per second or more. As shown in FIG. 4A, the plume evolves to fill the compartment 21 and in general to undergo internal collisions among matrix molecules and between matrix and analyte molecules as well as with the walls 20 of the specimen holder. This results in a randomization of the directions of movement of the molecules, and in the case of molecules having various degrees of freedom beyond the three orthogonal translational modes, as is typically the case for proteins and large organic molecules, the energy may also be partitioned internally to result in a substantially lower average velocity with a well behaved Maxwellian distribution. As shown in FIG. 4A, the molecules reach the exit apertures 22 after a relatively short diffusion time. FIG. 4B then shows the plume material accelerated from the apertures upon the application of an electric extraction field $E_{ext}$. Thus the apertures 22 provide the sample through discrete openings of defined size with a velocity which has been at least partly randomized, and preferably fully randomized with a Maxwellian distribution and a low mean velocity. This defined initial condition results in time of flight spectra having more sharply defined peaks and less spreading, resulting in a calculated mass resolution which is not only several times higher than conventional instruments, but can be independent of mass, resulting in a substantial improvement in spectral definition at high molecular weights.

Figure 5A:
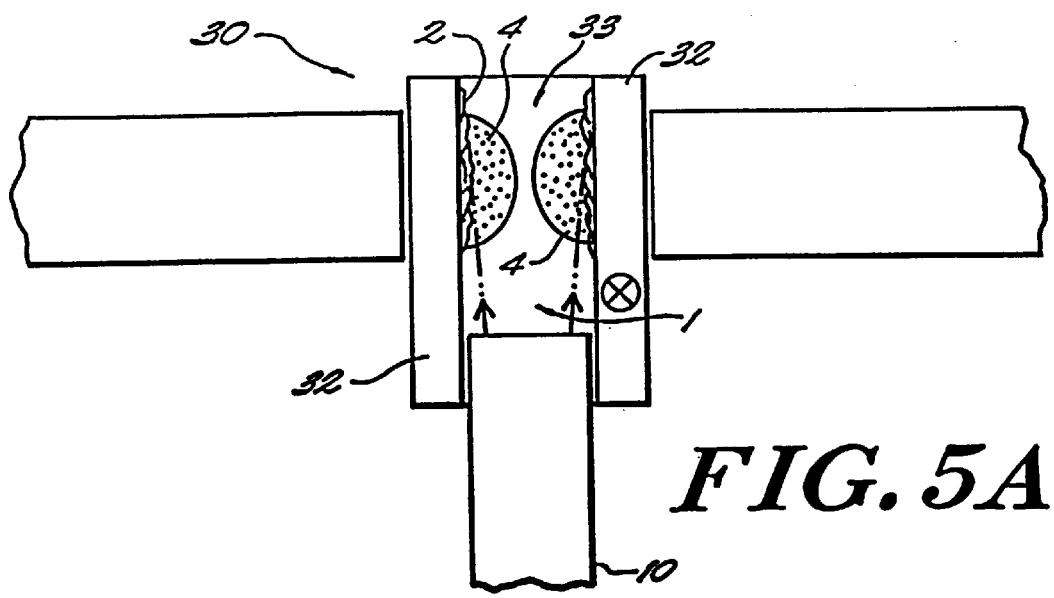
FIGS. 5A and 5B illustrate a second embodiment and its operation.
Figure 5B:
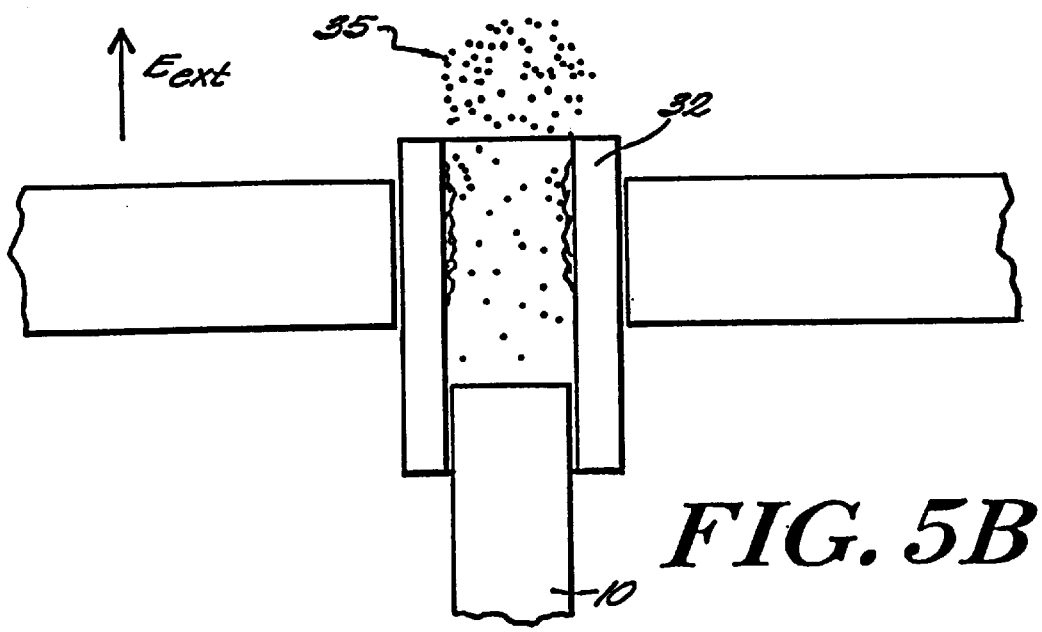

FIGS. 5A and 5B illustrate a second embodiment 30 of the present invention in which a single body of novel construction has replaced the substrate and compartment of the first embodiment. Here, a high aspect capillary 32 is held by an electrically conducting housing or jacket 9, which serves for example to provide a uniform and field flattening conductive starting plane for the spectrometric acceleration. The sample 2 is deposited on inside walls of the capillary, which in turn surrounds the end of fiber 10 so that the output beam diverging from the fiber end irradiates the sample 2 and causes a plume of material to be ejected from the sides of the capillary into the central lumen 33. In this case, if the sample 2 is coated as a band around the interior of the capillary, the resultant plume is self-interfering, i.e. the highly directional desorption plume is aimed radially inward so that material from different portions of the wall collides with plume material from other portions resulting in a high incidence of collision within the small capillary volume 33. As further shown in FIG. 5B, the extraction electric field results in acceleration of a thermalized sample of material 35 along a direction transverse to the capillary axis into the analysis instrumentation.

The confinement geometry shown in FIG. 5A can also be used in a top illumination arrangement. In that case the laser beam emerging from the fiber 10 is preferably replaced by a focused or small diameter laser beam entering the confinement from the front (i.e. facing the mass analyzer) side.

As is apparent from the foregoing example, the confinement of the plume need not amount to a total enclosure, but need only include an arrangement which assures collisional interaction of the desorbed material, preferably including at least one collision with a wall of a physical confining structure, which may for example change the direction of molecular travel and thus more quickly reduce the highly directional momentum by collisions among molecules of the desorbed material.

Figure 6A:
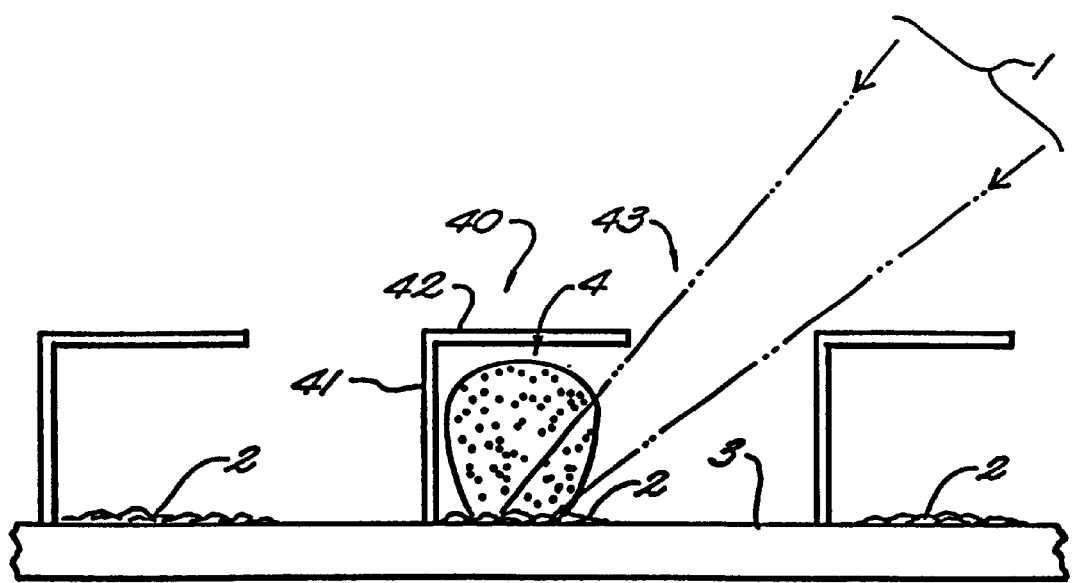
FIGS. 6A and 6B illustrate a third embodiment and its operation for top illumination.
Figure 6B:
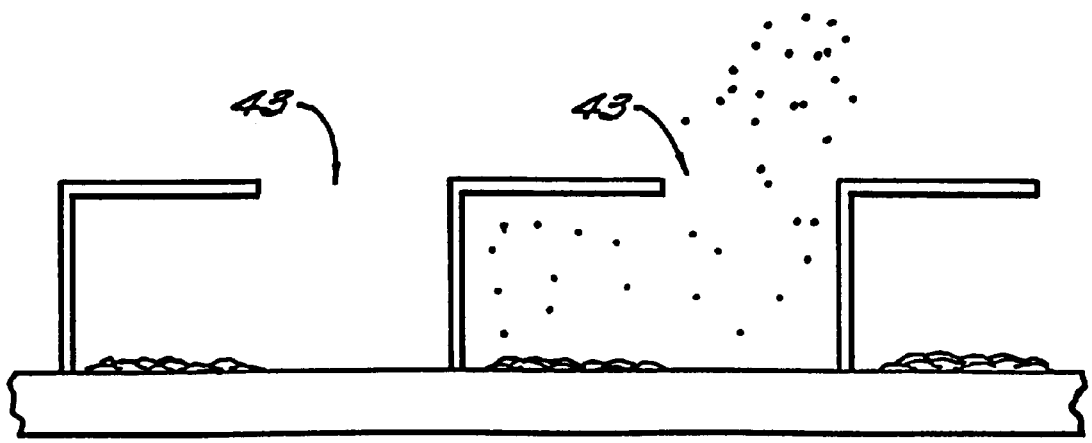

FIGS. 6A and 6B illustrate another confinement arrangement, which in this case is configured for top side (i.e. the side of ion extraction) illumination. As before the numerals 1, 2, 3 and 4 designate respectively the laser illumination beam, the sample, the substrate holding the sample and the plume emitted by desorption from the sample. In this embodiment, a structure 40 provides a barrier or overhang 42 across the emission path of the plume. Overhang 42 may for example consist of a shelf or cap held by a support or post 41. Overhang 42 does not entirely cover the sample 2, but extends like a lean-to with an open sector 43 allowing oblique illumination by the laser beam 1, focused to a small spot on the sample. As shown in FIG. 6B the plume then thermalizes under the lean to and is accelerated out through the sector 43, to provide slow ions to the analysis instrument, which traps or accelerates them from that point outward.

In all embodiments for a plume thermalization such as the examples shown in FIGS. 3 to 6, the ion extraction may be accomplished by implementing several retarding and acceleration electric fields generated by suitable electrodes and/or meshes in the space between the plume confinement structures and the mass analyzer. One such mesh 80 at a potential U relative to the confinement is drawn in FIG. 3A by way of illustration. All potentials of the retarding or extraction electrodes may be time modulated, e.g. time delayed.

Figure 7:
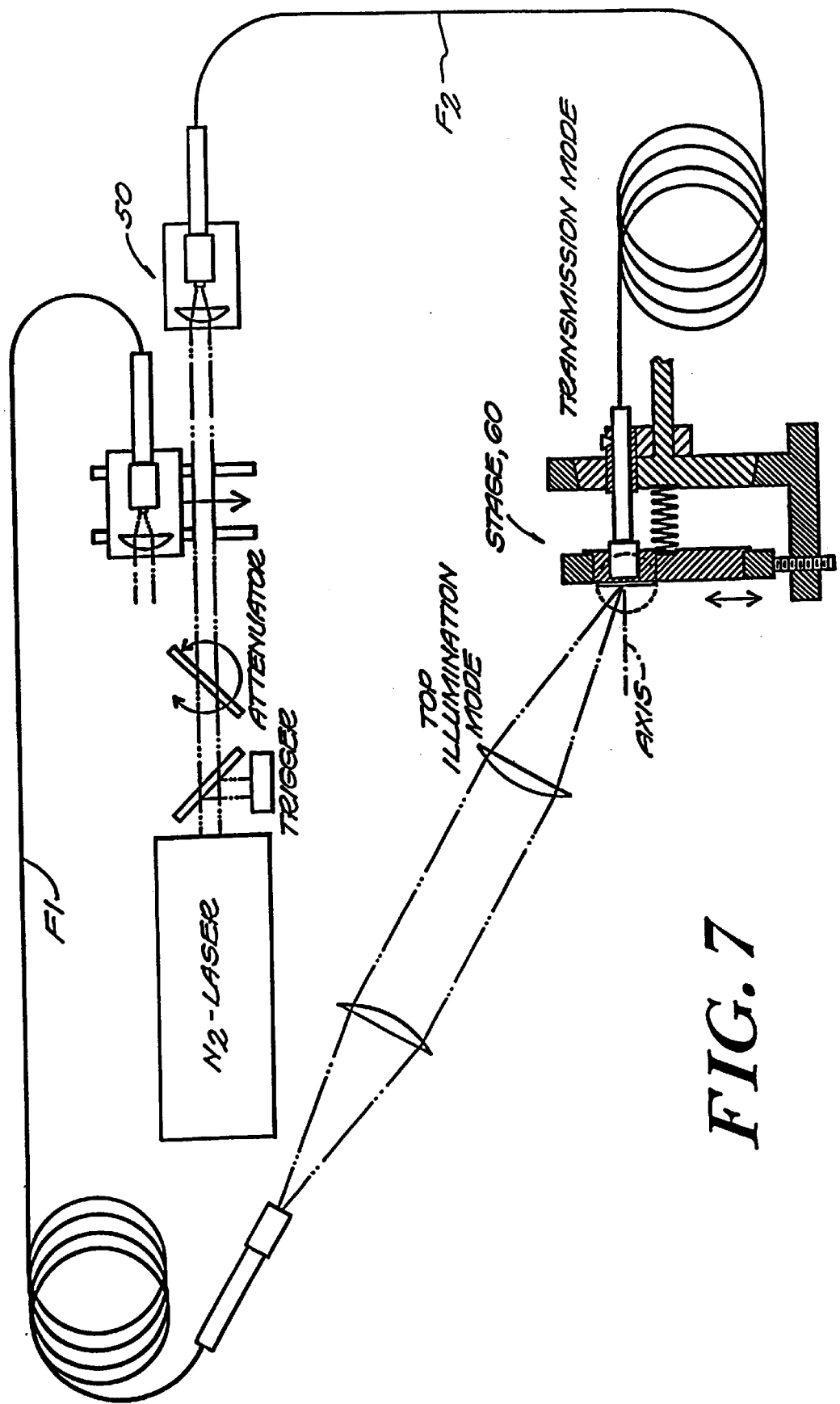
FIGS. 7 and 7A illustrate an experimental MALDI set up.
Figure 7A:
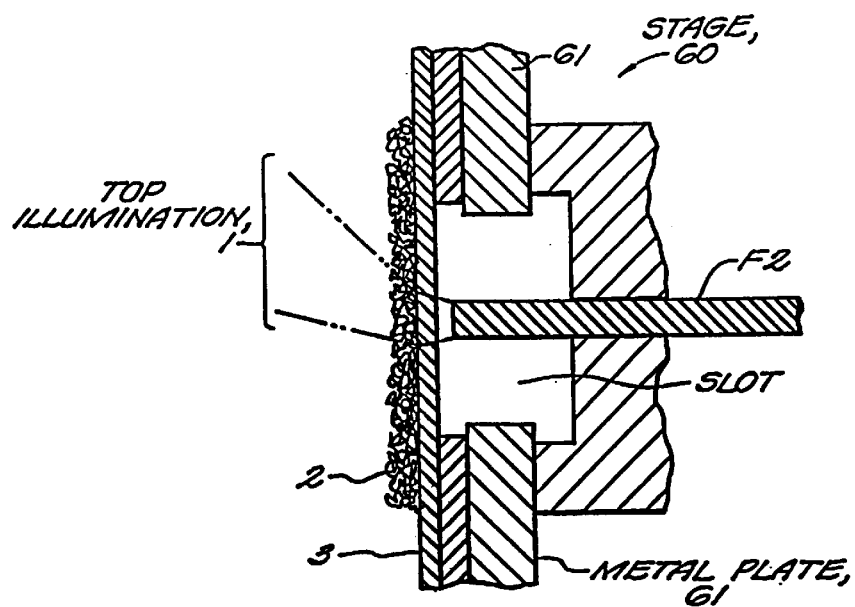

While the foregoing arrangements have shown physical barriers in which an external structure such as a cap, cover or enclosure provides the thermalizing container, the invention further contemplates that the containment may result from more open structures implemented in part by the matrix itself. FIGS. 7 and 7A illustrate an experimental set up wherein thermalization has been observed to occur in a transmission mode illumination geometry due to partially thermalizing conditions provided by a bed of microcrystals of matrix material. In this apparatus 50, a laser source was set up to provide illumination to a first fiber $F_1$ for top illumination of the sample, or a second fiber $F_2$ for transmission illumination from the backside of the sample. The sample was held on a substrate 3 with the fiber $F_2$ carried by a stage with its end face positioned exactly on the axis of the mass analyzer. The emerging laser beam aims at a selected position on the sample which was controlled by the stage carriage. As best seen in FIG. 7A, the sample 2 consisted of a relatively thin bed of microcrystals having a maximum size in the range of a few to a few hundred micrometers deposited on the surface of the substrate facing the analysis chamber. In this case it was found that a substantial portion of the plume was emitted from the rear face of the crystals, i.e. the crystal faces the substrate and fiber, across a gap of no more than 5 micrometers, so that the emitted material quickly collided with the substrate and turned around to interact with plume material and result in a partially thermalized state of the desorbed material reaching the analysis instrument. The microcrystals lay in a random geometry, with rear faces lying a varying oblique angles so that the overall desorption momentum was initially less directional than for a top-illumination set-up, and quickly randomized further as the molecules collided and turned back into the flux of desorbed plume material.

As further shown in FIG. 7A, the stage 60 includes a metal plate 61 which provided a substantially flat field about the substrate 3 for enhanced emission and acceleration geometry. The illumination fiber $F_2$ passes through a slot in this planar electrode, and butts against the substrate 3. The fiber had a high numerical aperture and provided a substantially homogeneous beam profile of defined diameter at the sample. In the illustrated embodiment, a 141 $\mu$m fiber was used such that the butt coupled geometry provided a 200 micrometer spot on the sample. As further shown in FIG. 7A, the sample consisted of a typical drying deposit of microcrystals and macrocrystals on a simple glass cover sheet. The larger crystals were approximately 100 μm in dimension while the remaining microcrystals were a much smaller and were completely removed by the initial actuations of the laser. The macrocrystals themselves naturally oriented with the substrate faces at an assortment of angles so that the plume emitted at substantially normal incidence from these surfaces would quickly collide with the substrate, heading off in a direction generally away from the substrate and back into the plume material, quickly undergoing thermalization.

Figure 9A:
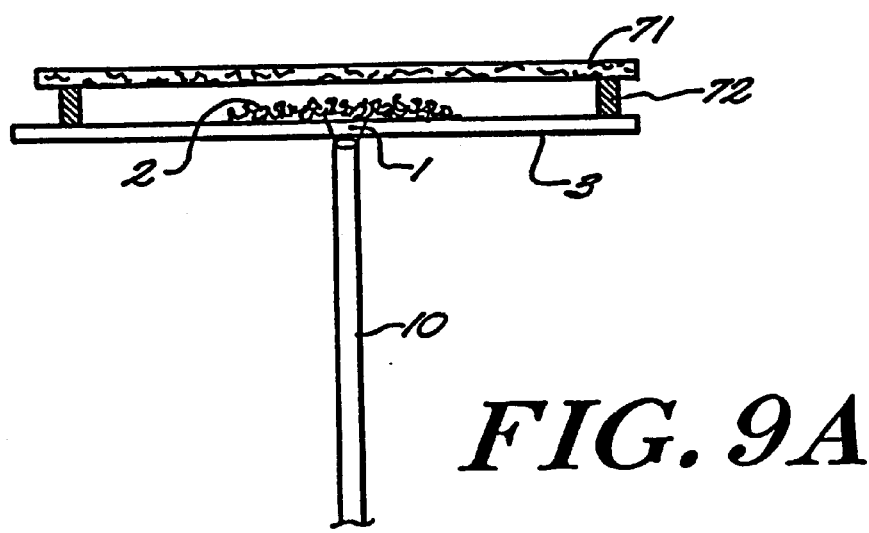
FIGS. 9A and 9B illustrate a fourth embodiment of the invention.
Figure 9B:
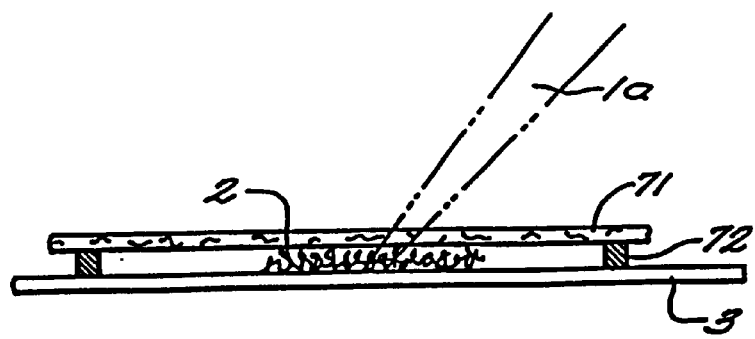

Skipping ahead briefly to FIGS. 9A and 9B, there is shown yet a fourth embodiment 70 of the invention, wherein containment, or more accurately, enhanced collisional interaction is provided by a porous or permeable structure. In this embodiment 70, the sample 2 is placed on a substrate 3, and covered with a shroud or sheath of porous or fibrous material 71 mounted above the sample with a suitable spacer 72. Thermalization of the plume then occurs upon extraction of the ions through the porous or fibrous sheath, with or without an applied electric field which may be provided by suitable electrodes. In a typical set up, the sheath 71 is thin, for example 100 μm or less, and the spacer 72 provides a free distance of the order of the sample thickness. By way of example, a pulp-based fibrous paper similar to a laboratory filter paper was found to thermalize the emitted plume, although in general the material for this layer will be selected to neither react with nor contaminate the plume.

In the embodiment shown in FIG. 9A, the sample is illuminated through the optically transparent substrate 3 in transmission geometry by a fiber 10 as described above. In the embodiment shown in FIG. 9B the sample is illuminated by a focused collimated light beam 1 in top illumination geometry through the porous or fibrous sheath 71 which is optically transparent or translucent. Suitable materials for the fibrous or porous sheath 71 include glass, ceramic and polymeric materials. A glass frit of a polymer or paper micropore membrane as used for cleaning or purifying liquids such as water is also suitable for the sheath 71. In an alternative embodiment (not illustrated) the sample can be placed directly onto the bottom side of the porous material, i.e., the side facing away from the mass analyzer. In another variation of this embodiment, the sample is incorporated into an optically transparent or translucent sheath of the porous material, and is illuminated in situ so that desorption occurs directly into the collision-enhancing porous structure of the sheath.

The foregoing examples show thermalization with various structures and bodies to illustrate a range of implementations of the invention, and these have involved simple mechanical elements. However it is not necessary to build up the thermalizing plume stage out of existing structures such a screens or capillary tubes. It is also possible to devise completely new structures for holding a sample to cause emission into a localized thermalizing environment. Thus for example the substrate 2 may consist of a plate having a plurality of thin needle-like projections or deep wells at its instrument-facing surface onto which the sample 2 is coated. In this case, the illumination 1 provided by the laser causes desorption from the sides of the pins, or from the walls of the wells, into a space confined by the surrounding walls or adjacent pins. The initial plume velocity then is substantially parallel to the general plane of the substrate and results in containment with a high collisional incidence, and subsequent emission of thermalized plume material across a plane normal thereto, at the ends of the pins or wells formed on the substrate. Such pins or wells may be formed as microstructures by known techniques of microlithography using compatible materials, and may for example be configured to additionally act as sample combs (e.g., hedgehog combs) or microtiter plates, allowing the support from a previous preparation process to serve as the substrate in a MALDI analyzer. Other novel microlithographic constructions will be readily implemented to provide an effective collision space for modulating the plume. Thermalization may be further improved by provision of a "collision buffer gas" to the confined, desorbed material. Preferably, the collision buffer gas promotes collisional dissociation, chemical ionization and/or molecule-molecule or ion-molecule reaction with the analyte.

Figure 8A:
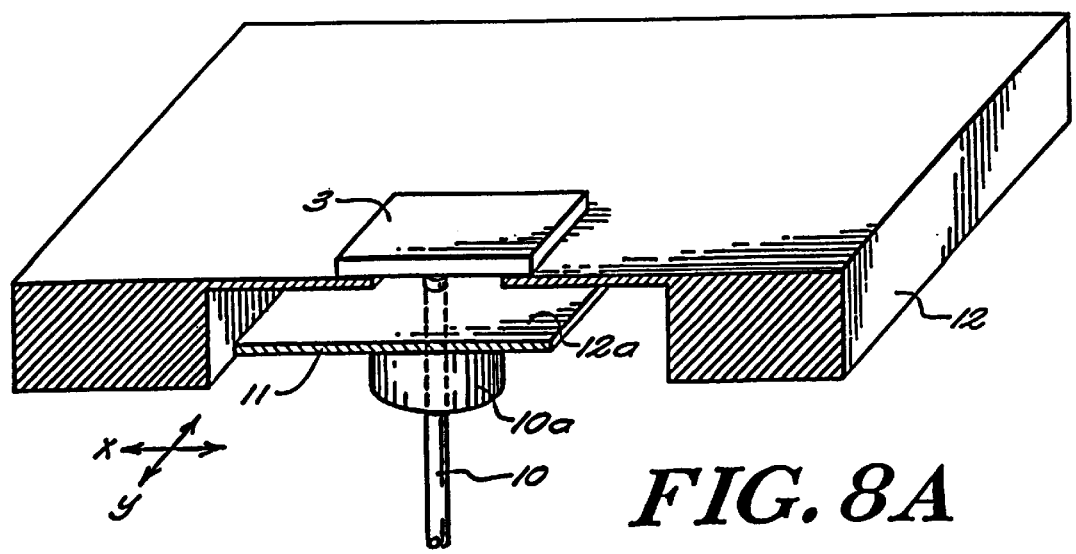
FIGS. 8A and 8B show a preferred stage for practice of the invention.
Figure 8B:
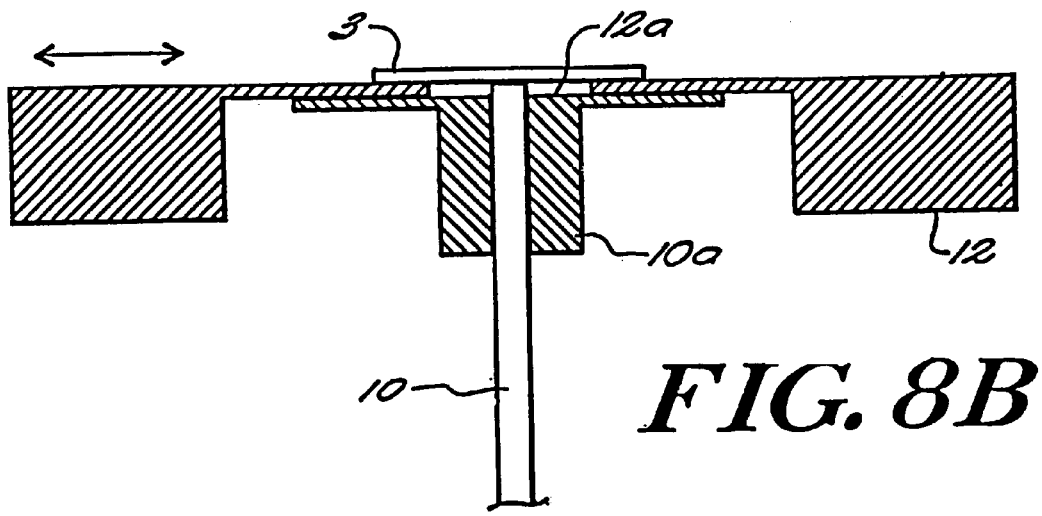

A preferred embodiment of the invention is implemented with the substrate 3 carried on a stage 12 which is configured in conjunction with the fiber carrier to allow the fiber to illuminate any selected x, y position on the substrate 3 and desorb material therefrom. Such a stage is illustrated in FIGS. 8A and 8B. As shown in perspective view in FIG. 8A, the fiber 10 is mounted in a collar 10a fixed to a plate 11 which provides a stable mechanical mounting to position the end of the fiber protruding from plate 11 into an opening 12a in a stage plate 12. The fiber end face is exactly centered in a fixed position on the axis of the mass analyzer so as to determine a symmetrical distribution of ions injected into the analyzer. The stage plate 12 is mounted inside the vacuum chamber for two dimension movement, e.g. by a conventional stage mounting and stepper drives, allowing illumination of any desired location of the sample or samples 2 on the substrate 3. Preferably, the substrate 3 has a somewhat conductive and dielectric thin layer of material on its bottom (fiber facing) side, which electrically contacts stage 12 and thus charges to an identical voltage as the stage, thereby providing a flat electrical field at the emission surface of the substrate 3.

In another aspect, the invention features a process for nucleic acid sequencing by directly analyzing nucleic acids contained in a pin-tool by MALDI mass spectrometry. In a preferred embodiment, the nucleic acid obtained from the sample is initially amplified. For example, a PCR reaction can be performed to "master" mix without addition of the dideoxynucleotides (d/ddNTPs) or sequencing primers. Aliquots can then be isolated via a conjugation means and transferred, for example to a sequencing plate, where d/ddNTPs and primers can then be added to perform a sequencing reaction. Alternatively, the PCR can be split between A, C, G, and T master mixes. Aliquots can then be transferred to a sequencing plate and sequencing primers added.

For example, 0.4–0.5 pmol of PCR product can be used in a cyclesequencing reaction using standard conditions, allowing each PCR to be used for 10 sequencing reactions (10× A, C, G, and T). The sequencing reactions can be carried out in a volume of 10 μl containing 5–6 pmol of 5-labeled sequencing primer in a standard 384 microwell plate allowing up to 96 sequencing reactions (3360 bases at 35 bases per reaction). Alternatively, a 192 microwell plate approximately 5×5 cm in a 12×16 format can be used. This format allows up to 48 sequencing reactions to be carried out per well, resulting in 1680 bases per plate (at 35 bases per reaction). The format of the sequencing plate will determine the dimensions of the transfer agent (e.g., pin-tool).

Figure 10:
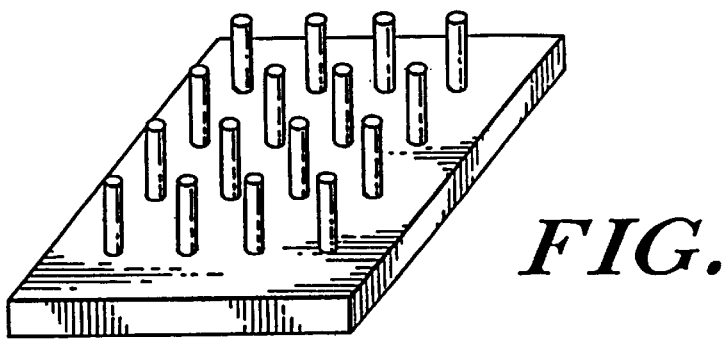
FIG. 10 schematically depicts a pin tool apparatus.

A pin tool in a 4×4 array (FIG. 10) can be applied to the wells of the sequencing plate and the sequencing products captured, e.g., on functionalized beads, which are attached to the tips of the pins ($\geq 1$ pmol capacity). During the capture/incubation step, the pins can be kept in motion (vertical, 1–2 mm travel) to mix the sequencing reaction and increase the efficiency of the capture.

Alternatively, the nucleic acid can be directly captured onto the pintool, for example, if an electrical field is applied, as shown in FIG. 14. When voltage is applied to the pintool, the nucleic acids are attracted towards the anode. This system also purifies nucleic acids, since uncharged molecules remain in solution and positively charged molecules are attracted to the cathode. For more specificity, the pintools (with or without voltage), can be modified to contain partially or fully single stranded oligonucleotides (e.g., about 5–12 base pairs in length). Only complementary nucleic acid sequences (e.g. in solution) can then be specifically conjugated to the pins.

In yet a further embodiment, a PCR primer can be conjugated to the tip of a pin-tool. PCR can be performed with the solid phase (pin-tool)-bound primer and a primer in solution, so that the PCR product becomes attached to the pin-tool. The pin-tool with the amplification product can then be removed from the reaction and analyzed (e.g., by mass spectrometry).

Figure 11:
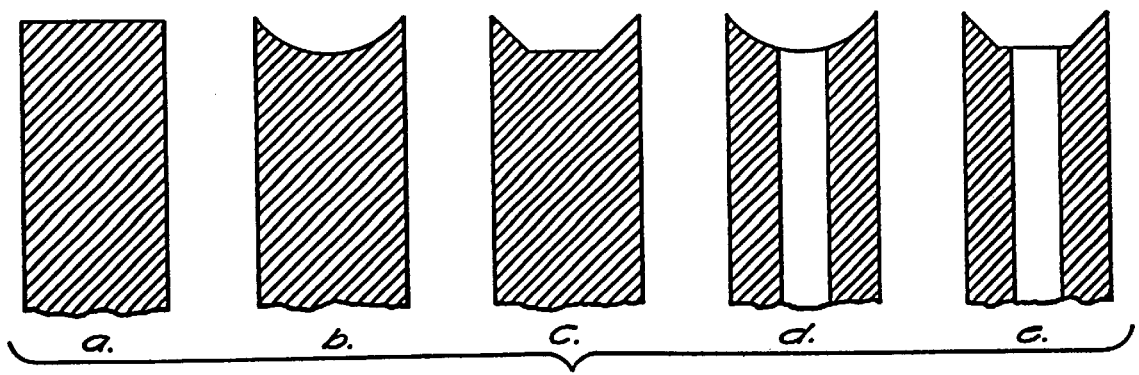
FIG. 11 depicts various pin conformations.

Examples of different pin conformations are shown in FIG. 11. For example, FIGS. 11A, 11B and 11C show a solid pin configuration. FIGS. 11D and 11E show pins with a channel or hole through the center, for example to accommodate an optic fibre for mass spectrometer detection. The pin can have a flat tip or any of a number of configurations, including nanowell, concave, convex, truncated conic or truncated pyramidal (e.g. size 4–800 pi across ×100 $\mu$ depth). In a preferred embodiment, the individual pins are about 5 mm in length and about 1 mm in diameter. The pins and mounting plate can be made of polystyrene (e.g. one-piece injection moulded). Polystyrene is an ideal material to be functionalized and can be moulded with very high tolerances. The pins in a pin-tool apparatus may be collapsible (e.g., controlled by a scissor-like mechanism), so that pins may be brought into closer proximity, reducing the overall size.

For detection by mass spectrometry, the pin-tool can be withdrawn and washed several times, for example in ammonium citrate, to condition the sample before addition of matrix. For example, the pins can simply be dipped into matrix solution. The concentration of matrix can then be adjusted such that matrix solution only adheres to the very tip of the pin. Alternatively, the pin-tool can be inverted and the matrix solution sprayed onto the tip of each pin by a microdrop device. Further, the products can be cleaved from the pins, for example into a nanowell on a chip, prior to addition of matrix.

Figure 12A:
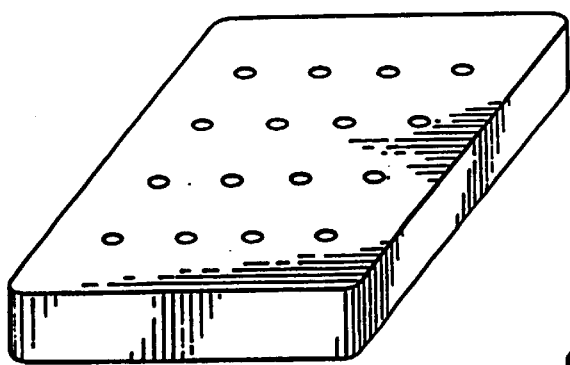
FIGS. 12A–C schematically represent a pintool apparatus and mount, each separately and a cross section of the mount and tool installed.
Figure 12B:
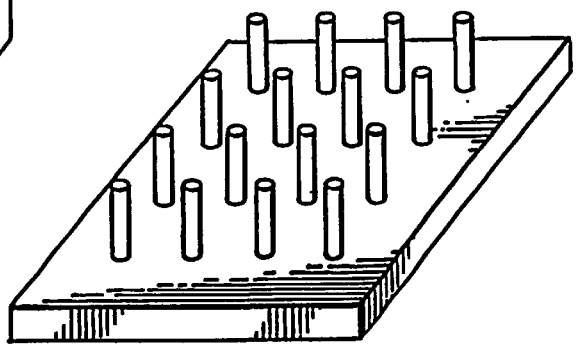
Figure 12C:
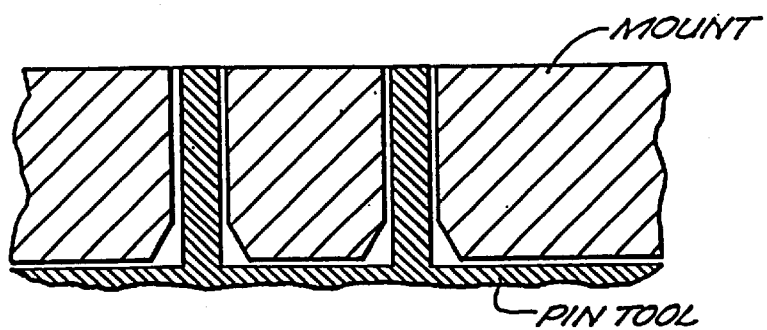

Tor analysis directly from the pins, a stainless steel "mask" probe to further confine the plume can be fitted over the pins in one scheme (FIG. 12) which can then be installed in the mass spectrometer.

Figure 13:
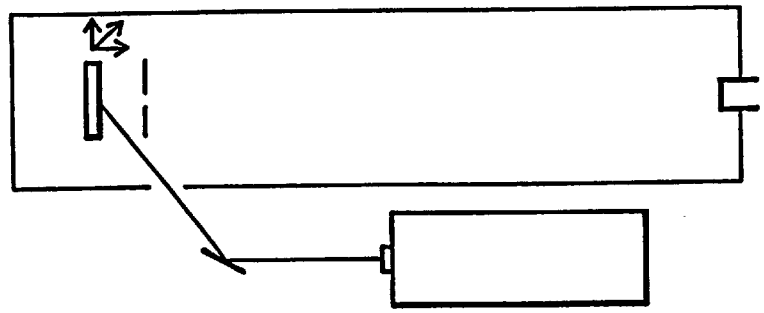
FIG. 13 and FIG. 13A show a schematic representation of mass spectrometry geometries for the pintools shown in FIG. 10, FIGS. 11A–E, and FIG. 12B.
Figure 13A:
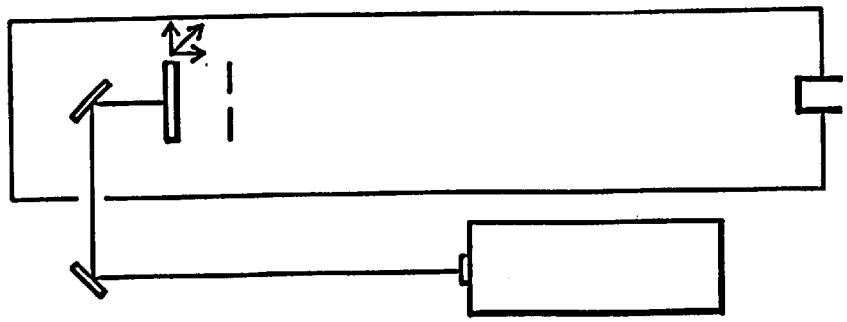

Two mass spectrometer geometries for accommodating the pin-tool apparatus are proposed in FIG. 13. The first accommodates solid pins. In effect, the laser ablates a layer of material from the surface of the crystals, the resultant ions being accelerated and focused through the ion optics. The second geometry accommodates fibre optic pins in which the samples are lasered from behind. In effect, the laser is focused onto the pin-tool back plate and into a short optical fibre (about 100 $\mu$m in diameter and about 7 mm length to include thickness of the back plate). This geometry requires the volatilized sample to go through the depth of the matrix/bead mix, slowing and cooling down the ions resulting in a type of delayed extraction which should actually increase the resolution of the analysis.

The probe through which the pins are fitted can also be of various geometries. For example, a large probe with multiple holes, one for each pin, fitted over the pin-tool. The entire assembly is translated in the X-Y axes in the mass spectrometer. Alternatively, as a fixed probe with a single hole, which is large enough to give an adequate electric field, but small enough to fit between the pins. The pin-tool is then translated in all three axes with each pin being introduced through the hole for sequential analyses. This format is more suitable for the larger pin-tool (i.e., based on a standard 384 well microplate format). The two probes described above, are both suitable for the two mass spectrometer geometries described above.

FIG. 15 schematically depicts the steps involved in mass spectrometry sequencing by post biology capture as described above.

This completes a description of basic embodiments of the invention and representative constructions for implementing the improved laser desorption of the present invention. The invention being thus disclosed and described, further variations and modifications will occur to those skilled in the art and all such variations and modifications are considered to be within the scope of the invention, as defined by the claims appended hereto.

What is claimed is:

1. A method, comprising:
   capturing nucleic acid molecules onto a pin of a pintool;
   illuminating the nucleic acid on the pin to generate desorbed nucleic acid and to partially randomize the directional momentum of the desorbed nucleic acid molecules; and
   determining the molecular weight of the desorbed nucleic acid molecules by mass spectrometry.

2. The method of claim 1, wherein the pin comprises a channel.

3. The method of claim 2, wherein the pin comprises an optical fiber within the channel.

4. The method of claim 1, wherein the configuration of the tip of the pin is selected from the group consisting of flat, nanowell, concave, convex, truncated conic, and truncated pyramidal.

5. The method of claim 1, wherein the pin comprises polystyrene.

6. The method of claim 1, wherein the pin is collapsible.

7. The method of claim 1, wherein the step of capturing the nucleic acid onto the pin comprises:
   contacting the pin with the nucleic acid; and
   applying an electrical field to the pin, whereby the nucleic acid is captured onto the pin.

8. The method of claim 1, wherein the step of capturing the nucleic acid on the pin comprises:
   contacting the pin with the nucleic acid; and
   hybridizing the nucleic acid to an oligonucleotide complementary to a portion of the nucleic acid, wherein the oligonucleotide is attached to the pin, whereby the nucleic acid is captured onto the pin.

9. The method of claim 8, wherein the oligonucleotide is fully or partially single-stranded.

10. The method of claim 1, wherein:
    the step of capturing the nucleic acid on the pin comprises attaching the nucleic acid to a functionalized bead; and
    the functionalized bead is attached to the pin, whereby the nucleic acid is captured onto the pin.

11. The method of claim 1, further comprising the step of contacting the pin with a matrix.

12. The method of claim 11, wherein the step of contacting the pin with the matrix comprises the step of dipping the pin in the matrix.

13. The method of claim 11, wherein the step of contacting the pin with matrix comprises the step of spraying the pin with the matrix.

14. The method of claim 1, wherein the step of illuminating the nucleic acid is by top illumination.

15. The method of claim 1, wherein the step of illuminating the nucleic acid is by transmission illumination.

16. The method of claim 1, further comprising the step of contacting the pin with a wash solution.

17. The method of claim 16, wherein the wash solution comprises ammonium citrate.

18. method of claim 1, further comprising the step of amplifying the nucleic acid.

19. The method of claim 18, wherein the nucleic acid is amplified before the step of capturing the nucleic acid onto the pin.

20. The method of claim 18, wherein the nucleic acid is amplified after the step of capturing the nucleic acid onto the pin.

21. The method of claim 18, wherein the nucleic acid is amplified by a process comprising the steps of:
hybridizing a primer to the nucleic acid; and
extending the primer in the presence of deoxynucleic acids.

22. The method of claim 21, wherein the primer is attached to the tip of the pin.

23. The method of claim 1, further comprising the step of inserting the tip of the pin into a well of a microwell plate.

24. The method of claim 1, further comprising the step of contacting the pin with a probe.

25. The method of claim 24, wherein the pin is fitted through a channel in the probe.

26. The method of claim 24, wherein the probe comprises stainless steel.

27. The method of claim 24, wherein the probe comprises one channel.

28. The method of claim 24, wherein the probe comprises multiple channels.

29. The method of claim 24, wherein the probe comprises a number of channels equal to the number of pins on the pintool.

30. The method of claim 1, wherein the directional momentum of the desorbed nucleic acid is fully randomized.

31. The method of claim 1, wherein the directional momentum of the desorbed nucleic acid is at least partially randomized by thermalization.

32. The method of claim 1, wherein the directional momentum is at least partially randomized by at least partially confining the desorbed nucleic acid molecules.

33. The method of claim 1, wherein the directional momentum is at least partially randomized by two-stage ion extraction.

34. method, comprising:
hybridizing a primer nucleic acid to a sample nucleic acid;
extending the primer in the presence of at least one nucleotide to produce an extended nucleic acid, wherein the nucleotide is selected from the group consisting of deoxynucleotide and dideoxynucleotide;
capturing the extended nucleic acid onto a pin of a pintool;
illuminating the extended nucleic acid on the pin to generate desorbed nucleic acid, wherein the directional momentum of the desorbed nucleic acid is at least partially thermalized; and
determining the molecular weight of the desorbed nucleic acid by mass spectrometry.

35. The method of claim 34, further comprising the step of amplifying the sample nucleic acid prior to hybridizing the primer nucleic acid to the sample nucleic acid.

36. A pintool, comprising:
two or more pins; and
nucleic acid captured onto at least one of the pins, wherein the pins provide means for confining desorbed material to at least partially randomize the directional momentum of the desorbed material.

37. The pintool of claim 36, wherein the pin comprises a channel.

38. The pintool of claim 36, wherein the configuration of the tip of the pin is selected from the group consisting of flat, nanowell, concave, convex, truncated conic, and truncated pyramidal.

39. The pintool of claim 36, wherein the pin comprises polystyrene.

40. The pintool of claim 36, herein the pin is collapsible.

41. The pintool of claim 36, wherein the means for confining desorbed material is a probe, wherein:
the probe comprises at least one channel; and
a pin is fitted through the channel.

42. A pintool, comprising:
two or more pins;
nucleic acid captured onto at least one of the pins; and
a probe in contact with at least one of the pins, wherein:
the probe comprises at least one channel, and
a pin is fitted through the channel.

43. The pintool of claim 42, wherein the probe comprises stainless steel.

44. The pintool of claim 42, wherein the probe comprises one channel.

45. The pintool of claim 42, wherein the probe comprises multiple channels.

46. The pintool of claim 42, wherein the configuration of the tip of the pin is selected from the group consisting of flat, nanowell, concave, convex, truncated-conic, and truncated pyramidal.

47. The pintool of claim 42, wherein the pin comprises polystyrene.

48. The pintool of claim 42, wherein the pin is collapsible.

49. The pintool of claim 42, wherein the pin comprises a channel.

50. The pintool of claim 49, wherein the pin comprises an optical fiber within the channel.

51. A pintool, comprising:
two or more pins; and
nucleic acid captured onto at least one of the pins, wherein:
a pin comprises a channel; and
a pin comprises an optical fiber within a channel.

52. The pintool of claim 51, wherein the configuration of the tip of the pin is selected from the group consisting of flat, nanowell, concave, convex, truncated conic, and truncated pyramidal.

53. The pintool of claim 51, wherein the pin comprises polystyrene.

54. The pintool of claim 51, wherein the pin is collapsible.

55. A method, comprising:
hybridizing a primer nucleic acid to a sample nucleic acid;
extending the primer in the presence of at least one nucleotide to produce two or more extended nucleic acids, wherein the nucleotide is selected from the group consisting of deoxynucleotide and dideoxynucleotide;

capturing the extended nucleic acids onto a pin of a pintool;

illuminating the extended nucleic acids on the pin to generate desorbed nucleic acids and at least partially randomizing the directional momentum of the desorbed nucleic acids; and determining the molecular weights of the nucleic acids by mass spectrometry.

56. A method, comprising:

capturing a nucleic acid onto a pin of a pintool, wherein the pintool comprises at least two pins illuminating the nucleic acid on the pin to generate desorbed nucleic acid and to at least partially randomizing the directional momentum of the desorbed nucleic acids; and determining the molecular weight of the desorbed nucleic acid by mass spectrometry.

57. A method comprising the steps of:

capturing a nucleic acid onto a pin of a pintool, wherein the pintool comprises at least two pins;

releasing the nucleic acid from the pin onto a substrate;

illuminating the nucleic acid on the substrate to generate desorbed nucleic acid; and determining the molecular weight of the desorbed nucleic acid by mass spectrometry.

58. A method, comprising the steps of:

capturing a nucleic acid onto a pin of a pintool, wherein the pintool comprises at least two pins;

releasing the nucleic acid from the pin onto a substrate;

illuminating the nucleic acid on the substrate to generate desorbed nucleic acid, wherein the directional momentum of the desorbed nucleic acids is at least partially randomized; and determining the molecular weight of the desorbed nucleic acid by mass spectrometry.

* * * * *

UNITED STATES PATENT AND TRADEMARK OFFICE
CERTIFICATE OF CORRECTION

PATENT NO. : 6,423,966 B2
DATED : July 23, 2002
INVENTOR(S) : Hillenkamp et al.

It is certified that error appears in the above-identified patent and that said Letters Patent is hereby corrected as shown below:

Column 1,
Line 60, please replace "1000 a" with -- 1000 --

Column 9,
Line 3, please replace "were a" with -- were --

Column 10,
Line 54, please replace "of 5" with -- of 5' --

Column 11,
Line 29, please replace "pi" with -- $\mu$ --
Line 50, please replace "Tor" with -- For --

Column 13,
Line 14, replace claim 18 with the following claim:
8. The method of claim 1, further comprising the step of amplifying the nucleic acid.

Line 55, replace claim 34 with the following claim:
34. A method, comprising:
hybridizing a primer nucleic aid to a sample nucleic acid;
extending the primer in the presence of at least one nucleotide to produce an extended nucleic acid, wherein the nucleotide is selected from the group consisting of deoxynucleotide and dideoxynucleotide;
capturing the extended nucleic acid onto a pin of a pintool;
illuminating the extended nucleic acid on the pin to generate desorbed nucleic acid,

UNITED STATES PATENT AND TRADEMARK OFFICE
CERTIFICATE OF CORRECTION

PATENT NO. : 6,423,966 B2
DATED : July 23, 2002
INVENTOR(S) : Hillenkamp et al.

It is certified that error appears in the above-identified patent and that said Letters Patent is hereby corrected as shown below:

wherein the directional momentum of the desorbed nucleic acid is at least partially thermalized, and > determining the molecular weight of the desorbed nucleic acid by mass spectrometry.

Signed and Sealed this

Seventeenth Day of December, 2002

JAMES E. ROGAN
*Director of the United States Patent and Trademark Office*